United States Patent [19]
Schmidt

[11] Patent Number: 5,485,858
[45] Date of Patent: Jan. 23, 1996

[54] METHOD OF AND APPARATUS FOR CLEANING OBJECTS OF PLASTICS PROCESSING MACHINES

[75] Inventor: Rudolf Schmidt, München, Germany

[73] Assignee: Caroline Christ Abgasfreie Werkzeugreinigungsapparate für die Kunststoffindustrie, Munich, Germany

[21] Appl. No.: 187,303

[22] Filed: Jan. 24, 1994

[30] Foreign Application Priority Data

Jan. 28, 1993 [DE] Germany .................... 43 02 415.7

[51] Int. Cl.⁶ ............................................ B08B 3/10
[52] U.S. Cl. ............................ 134/107; 134/111; 134/105
[58] Field of Search .................... 134/105, 108, 134/107, 56 R, 111, 200, 107; 68/18 R

[56] References Cited

U.S. PATENT DOCUMENTS

| | | | |
|---|---|---|---|
| 2,949,119 | 8/1960 | Smith | 134/108 X |
| 3,675,666 | 7/1972 | Cama | 134/105 |
| 4,111,715 | 9/1978 | Sprengling et al. | 134/105 X |
| 4,173,493 | 11/1979 | Kallas | 134/167 X |
| 4,290,439 | 9/1981 | Charpentier | 134/107 |
| 4,848,379 | 7/1989 | Schmidt | 134/107 X |
| 4,867,186 | 9/1989 | Otsuka | 134/111 |
| 4,877,043 | 10/1989 | Carmichael et al. | 134/111 |
| 4,919,161 | 4/1990 | Schmidt | 134/105 |
| 5,054,506 | 10/1991 | Shakeri | 134/111 |
| 5,112,577 | 5/1992 | Nishio | 134/108 |
| 5,190,065 | 3/1993 | Kovac et al. | 134/111 X |
| 5,268,036 | 12/1993 | Neubauer et al. | 134/105 X |

Primary Examiner—Frankie L. Stinson
Attorney, Agent, or Firm—Henry M. Feiereisen

[57] ABSTRACT

A method of and apparatus for removing plastic residues from objects of plastics processing machines includes a container with a treatment chamber filled with a heat transfer fluid and receiving an object such as extrusion heads or blow heads. A considerable reduction of the cleaning period is attained when withdrawing from the treatment chamber a portion of the heat transfer fluid and after being pressurized by a pump returning pressurized heat transfer fluid back into the chamber in form of a focused stream which is pointed in direction of the object being cleaned.

27 Claims, 1 Drawing Sheet

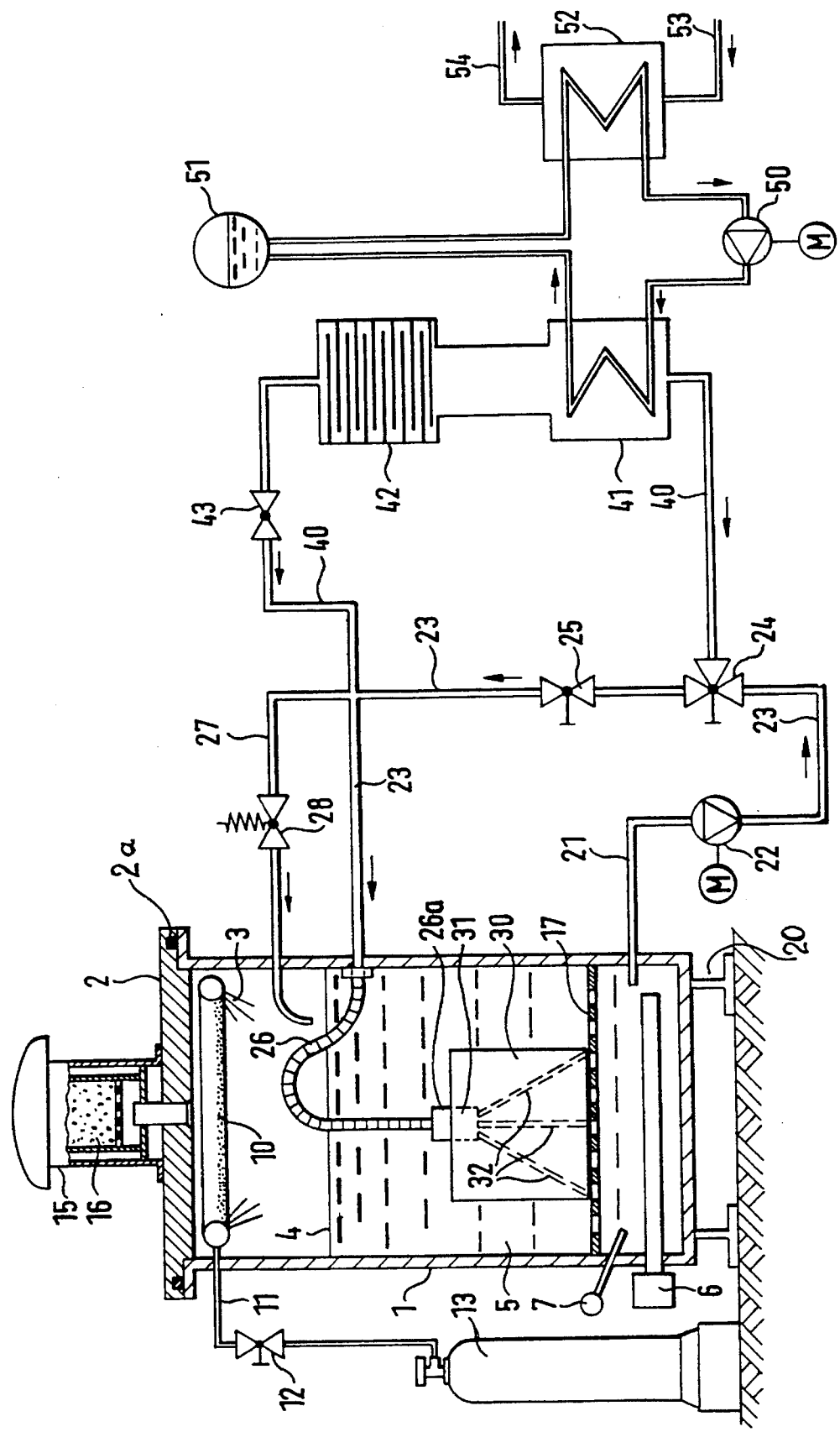

METHOD OF AND APPARATUS FOR CLEANING OBJECTS OF PLASTICS PROCESSING MACHINES

BACKGROUND OF THE INVENTION

The present invention refers to a method of and apparatus for cleaning objects of plastics processing machines from plastic coatings or residues adhering to the surface of the objects.

European Patent No. EP-A2-0 343 413 describes a cleaning apparatus with a heat insulated treatment container which is closable in air-tight manner by a lid carrying an activated carbon filter. The container has a treatment chamber which is filled with a liquid heat transfer fluid and receives the objects being cleaned from plastic residues. The heat transfer fluid is heated by a heating unit above the melting temperature of the plastic residues adhering to the surface of the objects. In order to attain an even temperature distribution and for shortening the treatment period, the heat transfer fluid is circulated by an impeller pump which is immersed in the heat transfer fluid. The treatment chamber is divided in a main compartment and a pump compartment, with the axis of the pump compartment extending parallel to the center axis of the main compartment. Upper and lower passageways connect the pump compartment with the main compartment. Inert gas is introduced into the space above the liquid level of the heat transfer fluid to prevent a decomposition of heat transfer fluid.

Objects of plastic processing machines from which adhering plastic residues should be removed include extrusion heads, blow heads, extrusion/blow heads, distributors, nozzles etc., i.e. objects which include bores and/or channels filled at least partly with solidified plastic material. Especially when the objects have long bores and/or bores of complicated structure, treatment periods become relatively long, and a dismantling before cleaning and subsequent re-assembly are required, rendering the overall cleaning process time consuming and complicated.

SUMMARY OF THE INVENTION

It is thus an object of the present invention to provide an improved method of and apparatus for cleaning objects of plastics processing machines from residues, obviating the afore-stated drawbacks.

In particular, it is an object of the present invention to improve a method of and apparatus for removing plastic residues from objects of plastics processing machines such that the cleaning time can be considerably shortened and is applicable for cleaning complicated objects such as single or multiple extrusion heads or blow heads, without requiring a prior dismantling thereof.

These objects and others which will become apparent hereinafter are attained in accordance with the present invention by providing a cleaning method in which a portion of the heat transfer fluid contained in the treatment chamber is withdrawn and set under pressure by a pump for return of pressurized fluid into the treatment chamber in form of a focused stream which is pointed in direction of the object being cleaned.

By returning withdrawn heat transfer fluid in form of a focused stream which impacts upon the object being cleaned, the period for accomplishing a complete cleaning of the respective object is considerably shortened compared to conventional methods because the focused stream flushes and removes continuously plastisized and liquefied plastic coatings, forming progressively inwardly from the outside. The immediate removal of softened plastic material is accomplished from surfaces of small objects such as nozzles, as well as from surfaces of larger objects such as extrusion heads or blow heads.

According to another feature of the present invention, the cleaning is further improved and the overall cleaning time further shortened by diverting a fraction of about 5 to 15% of withdrawn heat transfer fluid to a bypass in which the diverted fraction is cooled to a temperature below the melting temperature of the plastic material, subsequently filtered and then returned to the treatment chamber. Preferably, the cooling of the bypass is carried out indirectly via a secondary cooling circuit.

In accordance with the present invention, an apparatus for surface treating objects of plastics processing machines through removal of plastic residues or coatings adhering to the surface of the objects includes a pump which is arranged outside the treatment chamber for drawing heat transfer fluid from the chamber and forcing pressurized fluid through a pressure conduit back into the chamber via a hose which has a mouth piece securable in a position facing the object to be cleaned.

The use of a flexible hose allows a positional adjustment of the mouth piece in dependence of the shape and size of the object being cleaned and thus can be secured in a position most beneficial for a rapid cleaning action.

In connection with objects which are provided with bores and/or channels, a preferred embodiment of the cleaning apparatus allows a positioning of the mouth piece of the hose to face at least one bore or channel opening. Certainly, it is also possible to directly attach the mouth piece of the hose onto the object without any gap therebetween.

In order to ensure that towards the end of the cleaning process the bore (or bores) of the object is completely flushed with heat transfer fluid, it is preferred to provide the treatment chamber with a grating near the bottom area for placement of the object being cleaned. In this manner, the inlet opening as well as the outlet opening of each bore to be cleaned are free and unobstructed.

Advantageously, the hose is provided in form of a metallic corrugated tube to ensure sufficient temperature resistance.

The generation of a focused and directed stream of heat transfer fluid requires a certain minimum pressure which, however, should not exceed a maximum value to avoid occurrence of strong turbulences in the treatment chamber and to avoid a displacement of smaller objects by the pressurized stream in the treatment chamber. An appropriate pressure range can be set and maintained by using a suitable pump. It is also possible to arrange in the pressure conduit an adjustable pressure reducing valve or a simple throttle to provide the desired pressure.

If the mouth piece of the hose is positioned opposite to the bore opening or openings at a slight distance from the surface of the object being cleaned or is securely fixed at this location with the object, an increased pressure built-up is initially encountered since no or only a very slight passage of heat transfer fluid is possible through the object being cleaned. There are several possibilities to limit the initial pressure to a predetermined maximum value. A rather simple possibility includes to divert from the pressure conduit an overflow conduit which enters the chamber and contains an overflow valve with adjustable pressure value.

Alternatively or additionally, the pressure conduit may include a pressure reducing valve (control valve).

Heat transfer fluid aspirated by the pump from the chamber carries with progressive cleaning an increasing portion of liquid plastic material. As long as the temperature of the heat transfer fluid is kept slightly above the melting point of the plastic material, the entrained plastic material can simply be separated by arranging a three-way valve in the pressure conduit, with one outlet port of the three-way valve being connected to a bypass which conducts through a filter. Since the heat transfer fluid cools off in a circulation outside of the treatment chamber, the plastic material is separated by the filter.

The degree of separation can be significantly improved when the bypass is conducted through a cooler which precedes the filter or is combined with the filter to form a common structural unit.

As stated above, initially a higher pressure occurs in the pressure conduit, which would result in a reversal of the flow direction in the bypass during the initial phase of the cleaning process and thus to an unintentional reverse cleaning of the filter In order to prevent this from occurring, a check valve is arranged in the bypass downstream of the filter.

Water is preferably used as coolant. In order to avoid a contamination of water in the area of the cooler in the event of leakages, the coolant connections are supplied with coolant from a secondary cooling circuit which includes a circulation pump, a pressure compensating vessel and a secondary cooler which also operates with water as secondary coolant.

Advantageously, the pressure conduit may contain a throttle or pressure reducing valve upstream of the juncture of the bypass into the pressure conduit to ensure that the pressure in the pressure conduit at this juncture is lower than the pressure in the end section of the bypass.

BRIEF DESCRIPTION OF THE DRAWING

The above and other objects, features and advantages of the present invention will now be described in more detail with respect to the accompanying drawing in which the sole FIGURE 1 is a schematic, simplified illustration of a complete block diagram of a cleaning apparatus for removing plastic residues from a surface of objects of a plastics processing machine, including the relevant control devices.

DETAILED DESCRIPTION OF A PREFERRED EMBODIMENT

Referring now to the sole FIGURE 1, there is shown a schematic simplified illustration of a block diagram of a cleaning apparatus for removing plastic residues from a surface of objects of plastics processing machines. The cleaning apparatus includes a double-walled treatment container or vessel 1 which stands on a surface by means of a suitable support 20. The upper open end of the vessel 1 is closable by an end plate or lid 2 in an air tight manner via suitable seals 2a. Although not illustrated in detail, it will be appreciated by persons skilled in the ad that the vessel 1 and the lid 2 are preferably heat insulated.

The vessel 1 has a treatment chamber 3 which is filled with a liquid heat transfer fluid to fluid level 4 A heating element 6 raises the temperature of the transfer fluid 5 to a preselected value which is monitored by a temperature probe 7 and set by a conventional control loop (not shown).

The space in the treatment chamber 3 above the fluid level 4 contains a protective gas e.g. nitrogen which is supplied from a tank 13 via a conduit 11 and a valve 12 to a pipe 10 and introduced into the treatment chamber 3 through outlet openings of pipe 10. Air which is displaced through introduction of protective gas and/or heating of the heat transfer fluid 5 escapes via a filter unit 15 which is mounted at the outside of the lid 2 and filled e.g. with activated carbon 16.

Entering the treatment chamber 3 near the bottom of the vessel 1 is a suction conduit 21 which leads to a pump 22 driven by a motor M. The outlet of the pump 22 is connected to a pressure conduit 23 which communicates with the inlet port of a three-way valve 24 and leads back to the vessel 1 via a first outlet port of the three-way valve 24 and an adjustable throttle valve or pressure reducing valve 25. Inside the treatment chamber 3, the pressure conduit 23 is continued by a metallic corrugated hose 26.

Arranged inside the treatment chamber 3 above the suction line 21 is a grating 17 for receiving an object or workpiece 30 which is to be cleaned by the cleaning apparatus according to the invention. The object 30 may be a blow head or an extrusion head or any other suitable pad of a plastics processing machine, to which plastic residues or coatings may adhere. In the nonlimiting example of FIG. 1, the object 30 is symbolically represented by a triple tool which includes an inlet 31 for admission of plastic material and three traversing bores 32. At the beginning of the cleaning process, the inlet 31 and the bores 32 are at least partly filled with solidified plastic material. The provision of the grating 17 allows a positioning of the object 30 in such a manner that the outlet openings of the bores 32 of the object 30 are free and unobstructed in flow direction of the plastic material.

The hose 26 is provided with a mouth piece or nozzle tip 26a which is securely fixable in the inlet 31 of the object 30. Advantageously, the mouth piece 26a is detachably mounted to the end of the hose 26 so that differently dimensioned openings of tile object 30 can advantageously matched with a suitable mouth piece 26a.

Persons skilled in the art will understand that even though FIG. 1 shows a rigid connection between the mouth piece 26a and the object 30, such a rigid connection is not required. Rather, in particular for objects having freely exposed surfaces which are to be removed from plastic material adhering thereto or for objects having blind holes from which plastic material should be flushed out, it is suitable to secure the mouth piece 26a of the hose 26 by a suitable auxiliary device (not shown) in such a position that the focused stream of heat transfer fluid exits the mouth piece 26 at a slight distance to and is directed towards the surfaces or openings being cleaned. Such positioning of the mouth piece 26a of the hose 26 is also desired in case the objects being cleaned are of relative small dimensions and/or have bores or channels of large cross section.

As further shown in FIG. 1, an overflow conduit 27 is diverted at a cross point C from the pressure conduit 23 downstream of the throttle valve 25. The overflow conduit 27 contains an adjustable pressure control valve 28 and enters the treatment chamber 3 of the vessel 1 above the fluid level 4 of the heat transfer fluid 5.

Connected to a second outlet port of the three-way valve 24 is a bypass 40 which leads to a cooler 41. In the nonlimiting example of FIG. 1, the cooler 41 forms with a filter 42, e.g. a screen filter, a structural unit through which the bypass 40 is conducted. Downstream of the filter 42, the bypass 40 contains a check valve 43 and is connected at cross point C with the pressure line 23 downstream of the throttle valve 25.

Since the temperature of the heat transfer fluid can reach 300° C. and more, the cooler 41 is designed as primary cooler, with its coolant connections arranged in a secondary cooling circuit which contains a suitable coolant circulated by a motor-driven pump 50 via the cooler 41, a pressure compensating vessel 51 and a secondary cooler 52. The secondary cooler 52 runs also with water as coolant which is supplied via conduit 53 and discharged via conduit 54.

After having described the individual elements of the cleaning apparatus according to the invention, its mode of operation will now be set forth.

The object 30 to be cleaned is placed onto the grating 17. Before or after, the mouth piece 26a of the metallic corrugated hose 26 is secured in a position most favorable for removing plastic residues or directly mounted to the object 30. After closing the lid 2 and opening of valve 12 to provide a protective gas atmosphere above level 4 of the heat transfer fluid 5, the heat transfer fluid is heated to a desired preselected temperature which essentially depends on the type of plastic residues adhering to the surfaces of the object 30. Since an even heating of the heat transfer fluid and of the object 30 is important, the heating process is controlled by a control loop which receives the actual temperature value from the temperature probe 7. The control loop should be programmed in such a manner that the temperature increase per time unit remains constant (gradient control).

After reaching the softening temperature of the plastic material to be removed, the pump 22 is started to draw heat transfer fluid through the suction line 21 which is suitable designed as riser pipe. Pressurized fluid is then forced via the pressure conduit 23, the three-way valve 24 and the throttle valve 25 into the hose 26. When directly connecting the mouth piece 26a with the object 30 or positioning the mouth piece 26a at a slight distance opposite to the object 30, the plastic material, which at the beginning of the cleaning process adheres in ample quantities to the surface of the object and/or in the bores thereof, permits only a small amount of heat transfer fluid to exit the mouth piece 26a. Therefore, a relatively high pressure built-up occurs in the pressure conduit 23. When the pressure in the pressure conduit 23 exceeds the maximum value set at the overflow valve 28, the overflow valve 28 opens so that withdrawn heat transfer fluid is returned completely or at least a major part thereof via the overflow conduit 27 back into the chamber 3.

The progressively softened and eventually melted plastic material adhering to the surfaces of the object 30 is increasingly flushed off and removed by heat transfer fluid exiting the mouth piece 26a in form of a focused stream. The progressive removal of plastic residues from the object 30 gradually increases the outlet cross sections so that the flow rate of heat transfer fluid in the pressure conduit 23 rises. At the same time, the pressure is lowered so that the overflow valve 28 closes. The entire flow of heat transfer fluid drawn from the treatment chamber 3 is then forced through the hose 26.

A major portion of removed plastic material is finely dispersed within the heat transfer fluid. If the cleaning process is sufficiently advanced, the three-way valve 24 is programmed in such a way that a fraction e.g. 5 to 15% of withdrawn heat transfer fluid is diverted via the second outlet pod of the three-way valve 24 into the bypass 40. This fraction is conducted through the cooler 41 for cooling the fluid to a temperature at which a precipitation of the plastic material takes place. The flow of the fluid together with the suspended plastic material is then conducted through the filter 42 for separating the precipitated plastic material. Diverted heat transfer fluid is returned to the main flow at cross point C (junction between the bypass 40 and the pressure conduit 23) via the check valve 43. The throttle valve 25 is suitably set to provide at cross point C a pressure which is smaller than the pressure in the terminal section of the bypass 40 i.e. smaller than the pressure at the second outlet port of the three-way valve 24 minus the pressure drop in the entire bypass. Otherwise, the diverted fraction of the heat transfer fluid would not circulate through the bypass 40.

Persons skilled in the art will understand that the three-way valve 24 may be designed in such a manner that the pressure at the first outlet port (in the main circuit) and at the second outlet port (in the bypass) can be set independently from each other and the desired quantitative division of the heat transfer fluid flows can be achieved at the same time so that throttle valve 25 may be omitted.

While the invention has been illustrated and described as embodied in a method of and apparatus for cleaning objects of plastics processing machines, it is not intended to be limited to the details shown since various modifications and structural changes may be made without deobjecting in any way from the spirit of the present invention.

What is claimed as new and desired to be protected by Letters Patent is set forth in the appended claims.

I claim:

1. Apparatus for removing plastic residues from objects of plastics processing machines to which plastic residues adhere; said apparatus comprising:

a closed container defining a treatment chamber for receiving an object to be cleaned, said treatment chamber being filled with a liquid heat transfer fluid;

heating means for raising the temperature of the heat transfer fluid to a level exceeding a melting or decomposition temperature of the plastic residues;

pump means arranged outside said treatment chamber and connected to said treatment chamber via a pressure conduit for circulating heat transfer fluid, said pressure conduit terminating in a hose which projects into said treatment chamber and has a mouth piece securable in a position pointing in direction of the object to be cleaned;

a three-way valve arranged in said pressure conduit;

a bypass connected to one outlet port of said three-way valve;

a filter arranged in said bypass for separating removed residues from the heat transfer fluid; and cooling means arranged downstream of said three-way valve for lowering the temperature of heat transfer fluid in said bypass.

2. Apparatus as defined in claim 1 for removing plastic residues from an object having bores, said mouth piece of said hose being securable in a position pointing in direction of an opening into at least one of the bores in the object to be cleaned.

3. Apparatus as defined in claim 1 wherein said mouth piece of said hose is connectable with the object to be cleaned in an area of at least one of the bores.

4. Apparatus as defined in claim 1 wherein said hose is a metallic corrugated hose.

5. Apparatus as defined in claim 1 wherein said treatment chamber includes a bottom grating for supporting the object being cleaned.

6. Apparatus as defined in claim 1, and further comprising an overflow conduit containing an adjustable overflow valve, said overflow conduit being connected to said pressure conduit and entering said treatment chamber.

7. Apparatus as defined in claim 1, and further comprising an adjustable pressure reducing valve contained in said pressure conduit.

8. Apparatus as defined in claim 1, and further comprising a three-way valve arranged in said pressure conduit, a bypass connected to one outlet port of said three-way valve and a filter arranged in said bypass for separating removed residues from the heat transfer fluid.

9. Apparatus as defined in claim 1 wherein said cooling means is arranged ahead of said filter in said bypass.

10. Apparatus as defined in claim 1 wherein said cooling means forms with said filter a common structural unit.

11. Apparatus as defined in claim 1 wherein said cooling means includes a secondary cooling circuit having a circulation pump, a pressure compensating vessel and a secondary cooler for circulating water as secondary coolant.

12. Apparatus for removing plastic residues from objects of plastics processing machines to which plastic residues adhere; said apparatus comprising:

a closed container defining a treatment chamber for receiving an object to be cleaned, said treatment chamber being filled with a liquid heat transfer fluid;

heating means for raising the temperature of the heat transfer fluid to a level exceeding a melting or decomposition temperature of the plastic residues;

pump means arranged outside said treatment chamber and connected to said treatment chamber via a pressure conduit for circulating heat transfer fluid, said pressure conduit terminating in a hose which projects into said treatment chamber and has a mouth piece securable in a position pointing in direction of the object to be cleaned;

a three-way valve arranged in said pressure conduit;

a bypass connected to one outlet port of said three-way valve;

a filter arranged in said bypass for separating removed residues from the heat transfer fluid; and a check valve in said bypass downstream of said filter.

13. Apparatus as defined in claim 12 for removing plastic residues from an object having bores, said mouth piece of said hose being securable in a position pointing in direction of an opening into at least one of the bores in the object to be cleaned.

14. Apparatus as defined in claim 12 wherein said mouth piece of said hose is connectable with the object to be cleaned in an area of at least one of the bores.

15. Apparatus as defined in claim 12 wherein said hose is a metallic corrugated hose.

16. Apparatus as defined in claim wherein said treatment chamber includes a bottom grating for supporting the object being cleaned.

17. Apparatus as defined in claim 12, and further comprising an overflow conduit containing an adjustable overflow valve, said overflow conduit being connected to said pressure conduit and entering said treatment chamber.

18. Apparatus as defined in claim 12, and further comprising an adjustable pressure reducing valve contained in said pressure conduit.

19. Apparatus as defined in claim 12, and further comprising a three-way valve arranged in said pressure conduit, a bypass connected to one outlet port of said three-way valve and a filter arranged in said bypass for separating removed residues from the heat transfer fluid.

20. Apparatus for removing plastic residues from objects of plastics processing machines to which plastic residues adhere; said apparatus comprising:

a closed container defining a treatment chamber for receiving an object to be cleaned, said treatment chamber being filled with a liquid heat transfer fluid;

heating means for raising the temperature of the heat transfer fluid to a level exceeding a melting or decomposition temperature of the plastic residues;

pump means arranged outside said treatment chamber and connected to said treatment chamber via a pressure conduit for circulating heat transfer fluid, said pressure conduit terminating in a hose which projects into said treatment chamber and has a mouth piece securable in a position pointing in direction of the object to be cleaned;

a three-way valve arranged in said pressure conduit;

a bypass connected to one outlet port of said three-way valve;

a filter arranged in said bypass for separating removed residues from the heat transfer fluid; and a throttle or pressure reducing valve arranged in said pressure conduit between said three-way valve and a junction with said bypass.

21. Apparatus as defined in claim 20 for removing plastic residues from an object having bores, said mouth piece of said hose being securable in a position pointing in direction of an opening into at least one of the bores in the object to be cleaned.

22. Apparatus as defined in claim 20 wherein said mouth piece of said hose is connectable with the object to be cleaned in an area of at least one of the bores.

23. Apparatus as defined in claim 20 wherein said hose is a metallic corrugated hose.

24. Apparatus as defined in claim 20 wherein said treatment chamber includes a bottom grating for supporting the object being cleaned.

25. Apparatus as defined in claim 20, and further comprising an overflow conduit containing an adjustable overflow valve, said overflow conduit being connected to said pressure conduit and entering said treatment chamber.

26. Apparatus as defined in claim 20, and further comprising an adjustable pressure reducing valve contained in said pressure conduit.

27. Apparatus as defined in claim, 20, and further comprising a three-way valve arranged in said pressure conduit, a bypass connected to one outlet port of said three-way valve and a filter arranged in said bypass for separating removed residues from the heat transfer fluid.

* * * * *